United States Patent
Larraburu

[15] 3,644,037
[45] Feb. 22, 1972

[54] ANAMORPHIC LENS SYSTEMS

[72] Inventor: Philip Michel Larraburu, North Hollywood, Calif.

[73] Assignee: CK Optical Co., Inc., Inglewood, Calif.

[22] Filed: Apr. 28, 1969

[21] Appl. No.: 819,790

[52] U.S. Cl. .................................. 355/52, 350/181, 352/69
[51] Int. Cl. ........................... G03b 27/68, G02b 13/08
[58] Field of Search ................. 355/52; 350/181; 352/69

[56] References Cited

UNITED STATES PATENTS

| | | | |
|---|---|---|---|
| 2,121,567 | 6/1938 | Newcomer | 350/181 |
| 2,924,145 | 2/1960 | Landeau | 350/181 |
| 3,428,398 | 2/1969 | Gottschalk | 355/52 |

FOREIGN PATENTS OR APPLICATIONS

| | | | |
|---|---|---|---|
| 349,507 | 5/1931 | Great Britain | 350/181 |
| 377,952 | 1/1931 | Great Britain | 350/181 |

*Primary Examiner*—Samuel S. Matthews
*Assistant Examiner*—Robert P. Greiner
*Attorney*—Smyth, Roston & Pavitt

[57] ABSTRACT

An anamorphic lens system is provided which can be attached to a photographic camera. The anamorphic lens system takes width-compressed motion pictures and may be used for cinema-to-graphic projection at correspondingly concurring width expansion.

1 Claim, 5 Drawing Figures

INVENTOR:
Philip M. Larraburu

By Smyth, Roston & Pavitt
ATTORNEYS

ANAMORPHIC LENS SYSTEMS

The present invention relates to improvements for photographic image production using anamorphic techniques. More particularly, the invention relates to an anamorphic lens system which can be used as an attachment for a photographic camera. Anamorphic lens systems have been designed for taking width-compressed motion pictures and for cinematographic projection at correspondingly concurring width expansion. These anamorphic systems have been designed to accommodate particular expansion/compression ratios in relation to a particular photographic or projection lens. As a basic operating condition of such a system the film is always in or close to the focal plane of the principal (spherical) objective lens or lens system.

The inventive system relates to a different area of photography, which can be described generally as a 1:1 photographic copying process. In newspaper printing it is common to compose a master for a newspaper page on a sheet and to provide a photographic copy thereof on film and at 1:1 magnification; the printing process proceeds from there.

The inventive system, therefore, relates to such type of photographic arrangement, such that object and image have approximately similar size. The principal object of the invention is the optical adaptation of the master sheet format to the printing formats by relative expansion or compression of the image. The problem arises in newspapers where regular linograph technique establishes unduly wide settings. The text could well be compressed horizontally or expanded vertically to result in a more economical overall format. Also, for reprinting books in paperback, oversize reduction may be required for economic reasons, coupled with a relative format change definable as relative width compression or expansion.

In accordance with the preferred embodiment of the invention, it is suggested to place a negative or diverging cylindrical member on the optical axis of the photographic objective and at a selective distance for determining the desired relative compression or expansion. A positive or converging cylindrical member is placed on the optical axis, the cylinder axes of diverging and converging members being parallel to establish a particular active plane. The positive member reestablishes the conjugate planes of the photographic objective in the active plane. Positive and negative members have different focal lengths, but the difference is of the order of one percent.

The film holder has position remote from the focal plane of the photographic, spherical lens. The image plane is located at a distance from the photographic lens approximately twice the focal length thereof. The anamorphic system is placed on the image side of the photographic objective for producing compression and on the object side for producing expansion and in close proximity to the objective lens system.

The anamorphic system is not integrated in the photographic lens system but serves as a removable attachment. In other words, the anamorphic system is designed such that the camera lens can be used regularly without anamorphic attachment. It was discovered that such two cylindrical members having differing but approximately similar focal length can have different positions relative to each other and to the camera lens for obtaining different compression or expansion ratios. It was further discovered that the anamorphic system performs satisfactorily over a relative large range, 2:1, of focal lengths for the camera lens, the range to include the focal lengths of the two cylindrical members constituting the anamorphic system.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
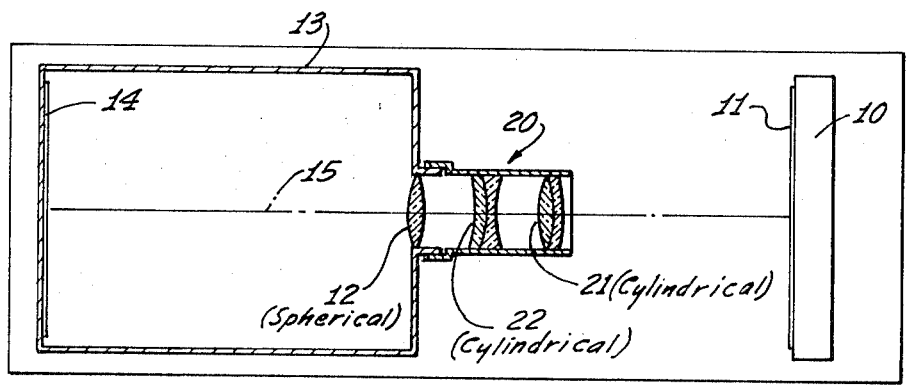
FIG. 1 illustrates schematically a cross section in a plane which includes the optical axis of a photographic system in accordance with the preferred embodiment of the invention.

Proceeding now to the detailed description of the drawings, the system illustrated in FIG. 1 includes a support 10 for a sheet 11 of printed material to be photographed for further processing. The sheet 11 is disposed in a plane serving as object plane of a photographic lens system 12. It may be assumed that aside from anamorphic compression photographic image is to be produced on a 1:1 magnification ratio, so that essentially the object plane has distance 1 from lens system at twice the focal length thereof.

The lens system 12 is mounted to a camera 13 with a film or plate 14 positioned about twice the focal length from the lens system, i.e., the photographic layer of film or plate 14 and object sheet 11 are disposed in conjugate planes for a 1:1 imaging process. Without further measures, the camera would take a picture as a 1:1 replica of the object sheet.

For reasons above, an image compression may be desired in one direction which is assumed to be a direction in the plane of the drawing, while the image magnification ratio as established by lens system 12 is to be maintained in the orthogonal direction within the image plane. An anamorphic system 20 provides the necessary image contraction in the plane of the drawing while being inactive in the orthogonal plane through the optical axis 15 of the entire system.

The anamorphic system 20 includes a positive doublett 21 and a negative doublett 22. The anamorphic lens system 20 serves as an attachment for the photographic objective system 12 of the camera. The negative doublett 22, having diverging characteristics, is shown as being placed on the object side of the system and causes an object point to be seen by the photographic lens 12 as if such object point were more closely positioned to the optical axis, i.e., as if the object were smaller. This accounts for the resulting spreading of the image, i.e., for relative magnification in the active plane for the anamorphosis. There is a corresponding relative displacement in image plane distance which is corrected by the preceding positive member 21.

The members 21 and 22 have slightly differing focal lengths, but the difference is considerably smaller than the distance between the two members from each other. Hence, the focal points of the two members do not even approximately coincide.

For selecting the desired expansion ratio the distance of the negative member 22 from the object plane is varied, as the diverging-deflecting effect is smaller the closer the negative member 22 is to the object plane, there being, of course, a concurrent increase in the distance of member 22 from the photographic objective 12. If the position of member 22 is varied, the relative distance between elements 21 and 22 must be varied as the distance correction as provided by lens 21 is different, accordingly. It follows that a particular selection of the distance of member 22 from objective lens 12 and of member 22 from member 21 determines the expansion ratio. However, regardless of distance, the anamorphic system 20 functions as expansion system in the active plane when placed on the object side.

The expansion ratio is not inherently fixed for the particular optical characteristics of objective lens 12; in other words, the system 20 is not integrated in the photographic camera lens, i.e., objective lens system 12, but within a relative wide range, the relative distances among elements 12, 21 and 22, are freely selectable parameters for purposes of determining a particular image expansion in the active plane of the anamorphic system.

The anamorphic system 20 can be placed in mirror image relation to objective 12 to operate on the image side thereof. In such situation, system 20 produces image compression. However, it is apparent that placement of the anamorphosing system on the object side, i.e., outside of the camera, has the advantage that it can be made rather easily removable as an attachment, in case the camera is to be used in times without expansion or compression.

While placement of the anamorphic system on the object side of the photographic lens produces image expansion, one can still produce relative image compression in the following manner in the inactive plane. It was assumed above that object and image distances were selected to be similar (corrected for the modification in optical length by the glass of the anamorphic system as effective in the inactive plane). This results in a 1:1 magnification.

For obtaining relative compression, the conjugate planes should be selected somewhat differently so that objective lens 12 produces a reduced size image, the reduction being precisely equal to the desired image compression, i.e., it may be assumed that the conjugate planes are selected, that the magnification is about 1:1.05. The anamorphic system is now placed on the object side as shown, and the distance parameters are selected such that its active plane includes the direction in which compression is not desired. The anamorphic system is effective such to expand the resulting image in that direction (for example, by about 5 percent) such that the expansion compensates precisely the image reduction as produced by the objective lens 12 for the selected conjugate planes. Thus, a 1:1 image example, is produced by cooperation of systems 20 and 12 in the active plane, in that the image size reduction produced by the camera lens is compensated by anamorphic expansion in one plane and this, in turn, produces a relative image compression in the inactive plane of the anamorphic system 20, by operation of the selected conjugate planes for objective system 12.

Figure 2:
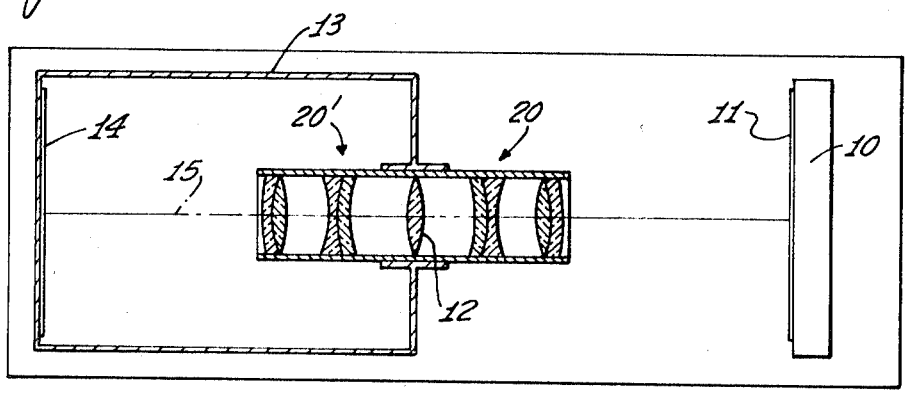
FIG. 2 illustrates schematically a modification of the system shown in FIG. 1; both views from the top.

Of course, a system in which image compression is produced by expansion in the orthogonal plane, however, requires refocusing, i.e., selection of a different pair of conjugate planes. If the camera is to produce an undistorted image at 1:1 magnification, without anamorphosing, refocusing is necessary, as it was assumed that the conjugate planes have been selected to produce smaller image, anamorphically expanded in one direction only. If such refocusing is undesirable, a different system can be constructed as schematically shown in FIG. 2. The interior of the camera includes an anamorphic system 20' providing relative compression in the plane of the drawing, while lens system 12 is positioned in relation to the image plane for a 1:1 image magnification in the inactive plane of anamorphic system 20'. The expanding anamorphic system 20 is placed selectively on the object side of the system to compensate the compression of system 20', so as to provide overall 1:1 image magnification without resulting compression or expansion in any direction and without resulting compression or expansion in any direction and without requiring refocusing. Removal of the object subsystem 20 results in image compression by system 20'. It should be mentioned that upon placing an anamorphic system into the light path, a shift in the conjugate planes occurs for reasons of placing glass into the optical path. For the inactive plane the "image" is shifted by a distance $(N-1)/N \cdot t$ where N is the index of refraction and $t=t_1+t_2+t_4+t_5$. Hence, in case an anamorphic system such as 20 is selectively placed in the optical path, (image or object side) a readjustment of the distance between image plane and lens (or a corresponding adjustment of the object plane) is required to offset this image shift.

The tow systems 20 and 20' may be positioned so that the inactive plane of one anamorphic system is the active plane of the other and vice versa, one expanding and one compressing the image in orthogonal directions. This permits selection of relative compression and expansion as respectively provided by each system individually to be rather small, so that second order distortion of each anamorphic system remains smaller than in case the total compression or expansion is produced by a single anamorphic system. The various undesired distortions introduced by an anamorphic system are now linear with the degree of expansion or compression produced.

The following example represents a pair of cylinder lenses which have been developed for use with advantage as an attachment to a 19 inches lens photographic objective lens system. However, it was found that other photographic objective lens systems such as a system having 24 inches focal length and a system having 12 inches focal length could be used successfully with the same anamorphosing system. The member 21 has a focal length of +19.899 inches; member 22 has a focal length of −20.080 inches. These two focal lengths are almost, but not quite, identical.

Figure 3:
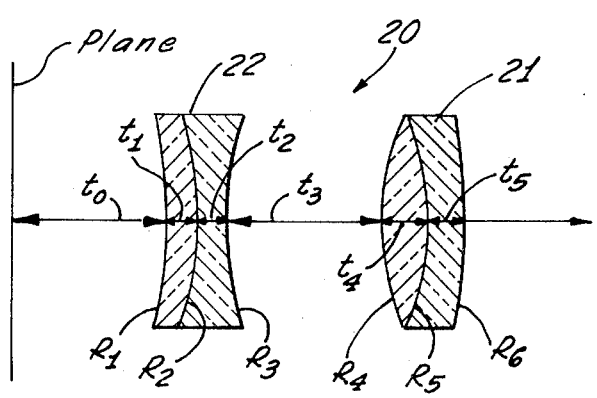
FIG. 3 illustrates a cross section through the anamorphic system in the active plane.

The negative member 22 is particularly characterized by these data, the radii and distances being taken from FIG. 3:

| Radii (inches) | Thickness (inches) | n (index of refraction) | v Abbe No. | Type |
|---|---|---|---|---|
| $R_1=38.817$ | $t_1=0.300$ | 1.620 | 38.1 | F9 |
| $R_2=-6.173$ | $t_2=0.214$ | 1.620 | 60.3 | SK 16 |
| $R_3=+18.327$ | | | | |
| focal length: −20.080 inches | | | | |

The positive member 21 is characterized by these data:

| | | | | |
|---|---|---|---|---|
| $R_4=19.399$ | $t_4=0.806$ | 1.620 | 60.3 | SK16 |
| $R_5=-6.41$ | $t_5=0.525$ | 1.620 | 36.4 | F2 |
| $R_6=-32.984$ | | | | |
| focal length: 19.899 inches | | | | |

The image shift in the inactive plane $(N-1)/N \cdot (t_1+t_2+t_4+t_5)=0.706$ inch.

The following table denotes various distances $t_0$ of the negative member from the 19 inches focal length objective lens 12 and corresponding distances $t_3$ between the two members 21 and 22. The resulting relative compression is listed in the third column under "Compression." The compression figures assume that anamorphic system 20 is placed on the image side of the photographic objective.

| $t_0=0$ | $t_3=0.934$ | Compression 6.8% |
|---|---|---|
| 0.2 | 0.865 | 6.4% |
| 0.4 | 0.804 | 6.1% |
| 0.6 | 0.746 | 5.8% |
| 0.8 | 0.691 | 5.6% |
| 1 | 0.642 | 5.4% |
| 1.2 | 0.595 | 5.1% |
| 1.4 | 0.549 | 4.9% |
| 1.5 | 0.529 | 4.8% |

Figure 4:
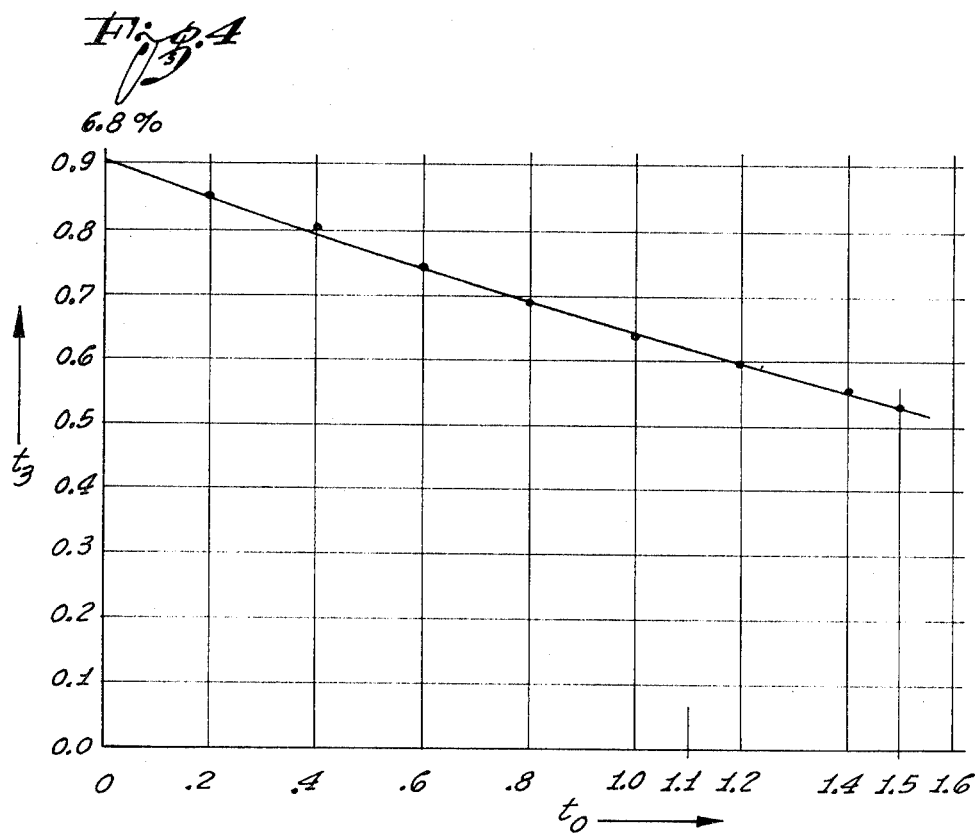
FIG. 4 illustrates a graph of calculated values for relative position of the members of the anamorphic system to each other, and the objective lens.

FIG. 4 illustrates these points and a smooth interpolating curve can be drawn to provide a continuous relationship in form of a steady function curve representing the relationship between distances $t_0$ and $t_3$.

Figure 5:
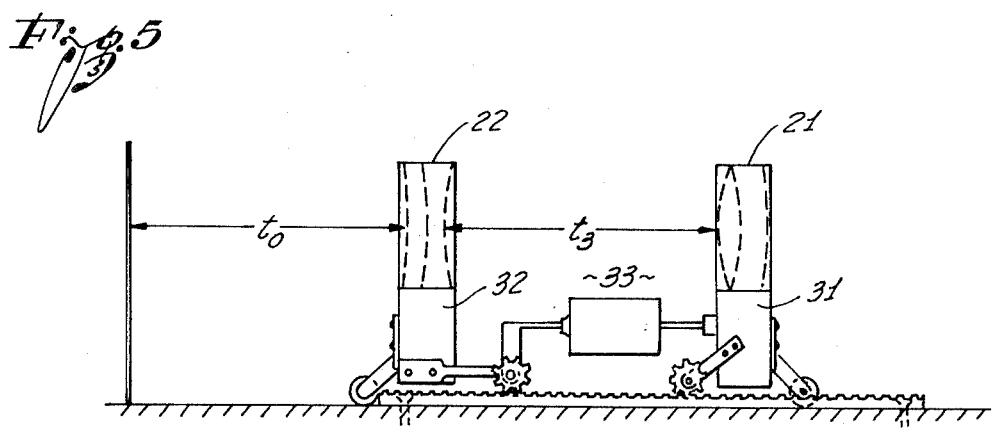
FIG. 5 illustrates schematically structure to realize the curve plotted in FIG. 3.

As shown schematically in FIG. 5, the two members 21 and 22 may have individual mounts 31 and 32, respectively, and these mounts are schematically shown as being movable in axial direction to permit adjustment of the distances $t_0$ and $t_3$. However, the two mounts are coupled to each other through linkage 33 such that the relative movement of mount 32 in variation of distance $t_0$ results in a variation of $t_3$ corresponding to the curve plotted in FIG. 4. This way the compression or expansion, as the case may be, is automatically adjustable.

The invention is not limited to the embodiments described above, but all changes and modifications thereof not constituting departures from the spirit and scope of the invention are intended to be included.

I claim:

1. A pair of optical active, cylindrical members which together define an anamorphic system for attachment to a photographic objective lens at particular distance therefrom to obtain a particular anamorphosing distortion, and at a particular distance from each other to establish an afocal system, the first one of the pair having radii $r_1$, $r_2$, $r_3$; the second one having radii $r_4$, $r_5$, $r_6$, in inches, each having index of refraction $-n$ and Abbe number $v$, in accordance with the following table:

$r_1 = -38.817$
$\quad n=1.62 \quad v=38.1 \quad t_1=0.300$
$r_2 = -6.173$ $r_3 = +18.327$
$r_4 = +19.399$
$\quad n=1.62 \quad v=60.3 \quad t_2=0.214$ $r_5 = -6.41$
$\quad n=1.62 \quad v=60.3 \quad t_4=0.806$ $r_6 = -32.984$
$\quad n=1.62 \quad v=36.4 \quad t_5=0.525$ $t_1, t_2, t_4, t_5$ respectively denoting lens thicknesses.

* * * * *